United States Patent
Chen et al.

(10) Patent No.: US 6,312,817 B1
(45) Date of Patent: Nov. 6, 2001

(54) FUSER ASSEMBLY WITH CONTROLLED POLYMERIC RELEASE AGENT SWELL INTERMEDIATE LAYER

(75) Inventors: Jiann H. Chen, Fairport; Stephen V. Davis, Rochester; Robert A. Lancaster, Hilton; Tulienne R. Molaire, Rochester, all of NY (US)

(73) Assignee: Nexpress Solutions LLC, Rochester, NY (US)

( * ) Notice: Subject to any disclaimer, the term of this patent is extended or adjusted under 35 U.S.C. 154(b) by 0 days.

(21) Appl. No.: 09/244,375

(22) Filed: Feb. 4, 1999

(51) Int. Cl.$^7$ .............................. B32B 9/04; B29D 22/00; G03G 15/20; B25F 5/02

(52) U.S. Cl. ..................... 428/447; 428/448; 428/906; 428/36.9; 428/36.91; 399/331; 399/333; 492/53

(58) Field of Search .................... 428/36.8, 35.8, 428/446, 447, 450, 906, 36.9, 36.91, 448, 220; 397/331, 333; 492/53, 56; 430/124

(56) References Cited

U.S. PATENT DOCUMENTS

| | | |
|---|---|---|
| 4,777,087 | 10/1988 | Heeks et al. . |
| 4,807,341 | 2/1989 | Nielsen et al. . |
| 5,200,284 | 4/1993 | Chen et al. . |
| 5,217,837 * | 6/1993 | Henry et al. ................ 430/124 |
| 5,246,980 * | 9/1993 | Palmer et al. ............... 523/200 |
| 5,269,740 | 12/1993 | Fitzgerald et al. . |
| 5,292,562 | 3/1994 | Fitzgerald et al. . |
| 5,292,606 | 3/1994 | Fitzgerald . |
| 5,336,539 | 8/1994 | Fitzgerald . |
| 5,466,533 * | 11/1995 | Fitzgerald et al. .......... 428/447 |
| 5,534,347 | 7/1996 | Chen et al. . |
| 5,547,759 * | 8/1996 | Chen et al. ................ 428/421 |
| 5,548,720 | 8/1996 | Fujii . |
| 5,582,917 | 12/1996 | Chen et al. . |
| 5,587,245 * | 12/1996 | Visser et al. ............... 428/447 |
| 5,654,052 * | 8/1997 | Visser et al. .............. 428/35.8 |
| 5,753,361 * | 5/1998 | Visser ........................ 428/323 |
| 5,766,759 | 6/1998 | Chen et al. . |
| 5,960,245 * | 9/1999 | Chen et al. ................ 399/333 |

* cited by examiner

Primary Examiner—Rena L. Dye
Assistant Examiner—Michael C. Miggins
(74) Attorney, Agent, or Firm—Lawrence P. Kessler

(57) ABSTRACT

A roller for use in a fusing assembly for receiving a polymeric release agent including a core and multiple layers secured over the core; and the multiple layers including at least one outer layer formed of a silicone mixture which absorbs the polymeric release agent and has toner release properties, and an intermediate layer formed of a silicone mixture selected so that its swelling in 1000 cts poly (dimethylsiloxane) is less than 1% by weight.

12 Claims, 2 Drawing Sheets

FUSER ASSEMBLY WITH CONTROLLED POLYMERIC RELEASE AGENT SWELL INTERMEDIATE LAYER

FIELD OF THE INVENTION

The present invention relates to fuser apparatus for use in electrostatographic printing apparatus, which includes an improved low swell fuser member intermediate layer.

BACKGROUND OF THE INVENTION

The present invention relates generally to an electrostatographic printing apparatus and more particularly to a fusing system for fixing toner to support substrate. In particular the present invention relates to a release member for a toner fixing station in such apparatus.

In the process of electrophotography, a light image of an original to be produced is typically recorded in the form of an electrostatic latent image upon a photosensitive member with subsequent rendering of the latent image visible by the application of electroscopic marking particles commonly referred to in the art as toner. The residual toner image can be either fixed directly upon the photosensitive member or transferred from the member to another support or receiver, such as a sheet of plain paper with subsequent affixing of the image thereto.

In order to fix or fuse the toner onto a support member permanently by heat, it is necessary to elevate the temperature of the toner to a point at which constituents of the toner coalesce and become tacky. This action causes the toner to flow to some extent into the fibers or pores of the support members or otherwise upon the surfaces thereof. Thereafter, as the toner cools, solidification of the toner occurs causing the toner to be bonded firmly to the receiver.

One approach to thermal fusing of toner images onto the supporting substrate has been to pass the receiver with the unfused toner images thereon between a pair of opposed roller members at least one of which is heated. During operation of a fusing system of this type, the receiver to which the toner images are electrostatically adhered is moved through the nip formed between the rolls with the toner image contacting the fuser roller thereby to affect heating of the toner images within the nip. Typical of such fusing devices are two roller systems wherein the fusing roller is coated with an adhesive mixture, such as a silicone. The silicone rubbers which have been used as the surface of the fuser member can be classified into three groups according to the vulcanization method and temperature, i.e., room temperature vulcanization silicone rubber referred hereinafter referred to as RTV silicone rubber, liquid silicone rubber to as LSR rubber, and high temperature vulcanization type silicone rubber referred to as HTV rubber. All these silicone rubbers or elastomers are well known in the art and are commercially available.

In these fusing systems, however, since the toner image is tackified by heat it frequently happens that a part of the image carried on the receiver will be retained by the heated fuser roller and not penetrate into the receiver surface. This tackified mixture will stick to the surface of the fusing roller and come in contact with the subsequent receiver sheet bearing a toner image to be fused. A tacky image which has been partially removed from the first sheet, may transfer to the second sheet in non-image portions of the second sheet. In addition, a portion of the tacky image of the second sheet may also adhere to the heated fuser roller. In this way and with the fusing of subsequent sheets of substrates bearing the toner images, the fuser roller may be thoroughly contaminated. In addition, since the fuser roller continues to rotate when there is no substrate bearing a toner image to be fused there between, toner may be transferred from the fuser roller to the pressure roll. These conditions are referred to in the copying art as "offset". Attempts have been made to control the heat transfer to the toner and thereby control the offset. However, even with the adhesive surfaces provided by the silicone elastomers, this has not been entirely successful.

It is well known in the art to provide toner release agent s such as silicone oil, in particular, poly(dimethylsiloxane), which is applied on the fuser roller to a thickness of the order of about 1 micron to act as a polymeric release agent. These mixtures possess a relatively low surface energy and have been found to be mixtures that are suitable for use in the heated fuser roller environment. In practice, a thin layer of poly(dimethylsiloxane) (silicone oil) release agent is applied to the surface of the heated roller to form an interface between the roller surface and the toner image carried on the support mixture. Thus, a low surface energy, easily parted layer is presented to the toners that pass through the fuser nip and thereby prevents toner from offsetting to the fuser roller surface. While silicone elastomer fuser members have been commercially successful in some commercial applications they suffer from certain difficulties in that they tend to swell by being in contact with a silicone oil release agent which migrates or is absorbed into the silicone nibber. While a small degree of swelling may be acceptable if it is uniform, failure of such rolls has been observed by excessive swelling over a period of operation. Under such circumstances, the fuser member may no longer function in providing a uniform fusing and may lead to poor receiver handling. An additional failure mode is referred to as debonding wherein the swelling of the silicone rubber has become so significant that it actually delaminates from the core as described in U.S. Pat. No. 4,777,087 by Heeks et al.

To reduce damage to the fuser member by the release agent, it is known to dispose an intermediate layer beneath the outer silicone layer. Such barrier layer should be impervious to release agent swell. Applicable materials are described in U.S. Pat. No. 5,200,284, which is polyester based, U.S. Pat. No. 5,766,759 which is a polyurethane, U.S. Pat. Nos. 5,582,917, and 5,534,347 which are fluorosilicone interpenetrating networks. There are advantages as disadvantages for each of the above. The nonfluorosilicone lack temperature stability. The others loose adhesion with release agent swell.

There is a need for processable, cost-effective fuser member intermediate layer which are resistant to release agent swell and whose adhesion to the outer layer is not significantly compromised by release agent swell.

SUMMARY OF THE INVENTION

It is an object of the present invention to provide an improved fuser member intermediate layer that has a controlled polymeric release agent swell.

A further object of the present invention is to provide fuser member intermediate layer which can be readily assembled.

These objects are achieved in a roller for use in a fusing assembly for receiving a polymeric release agent comprising:

(a) a core and multiple layers secured over the core; and
(b) the multiple layers including:
   (i) at least one outer layer formed of a silicone mixture which absorbs the polymeric release agent and has toner release properties; and (ii) an intermediate layer formed of a silicone mixture selected so that its swelling in 1000 cts poly (dimethylsiloxane) is less than 1% by weight.

An advantage of the present invention is that by decreasing the polymeric release agent swell of the fuser member intermediate layer the tendency of the fuser member outer layer to debond is reduced as well as maintaining the mechanical properties of the fuser member outer layer.

Another advantage of the current invention is that it successfully reduces polymeric release agent swell resulting in the advantages listed above while maintaining the non-release agent swollen adhesion and improving the release agent swollen adhesion.

DETAILED DESCRIPTION OF THE PREFERRED EMBODIMENT

Figure 1:
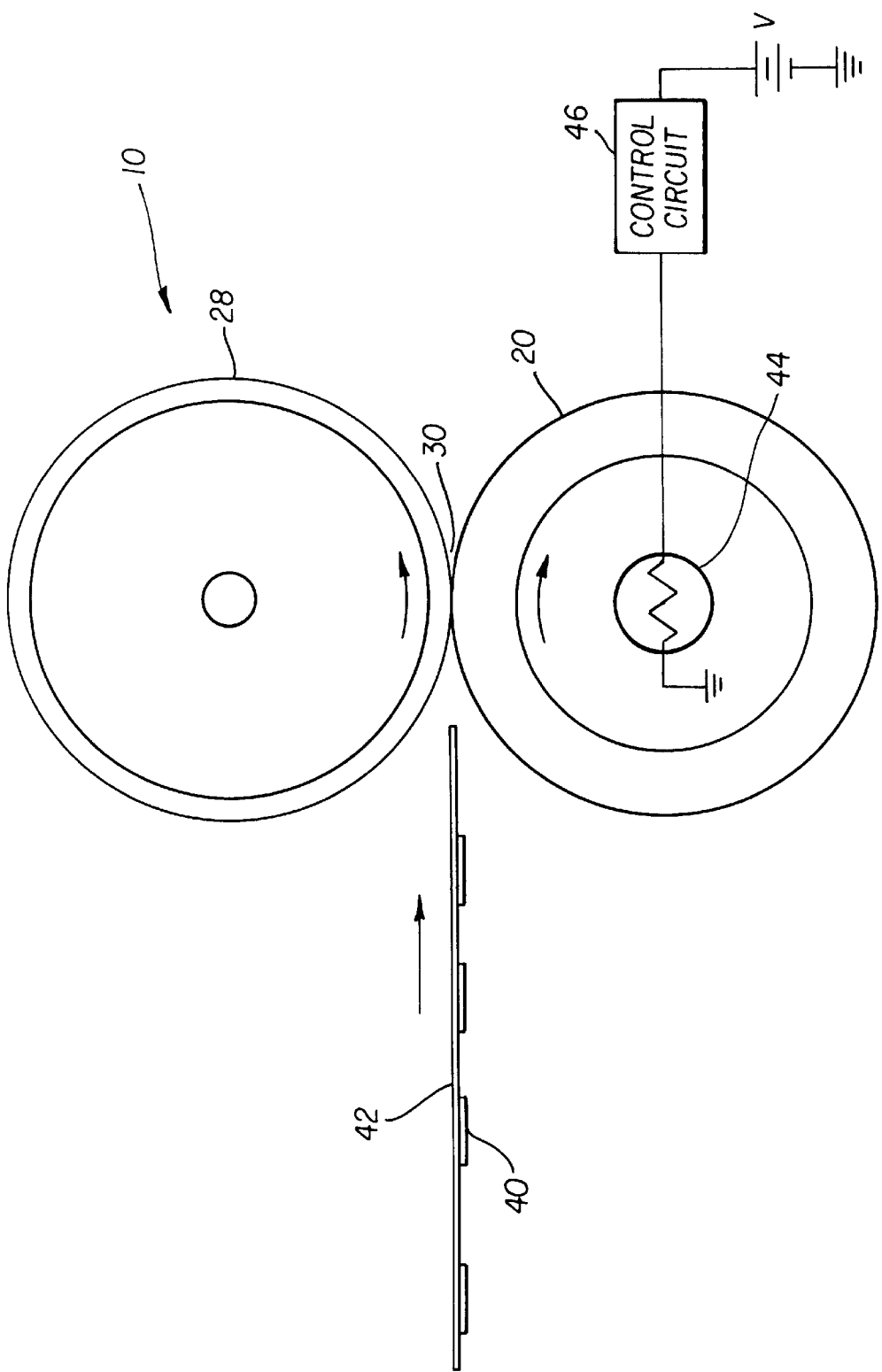
FIG. 1 is a schematic front cross-sectional view of a fuser assembly in accordance with the present invention.
Figure 2:
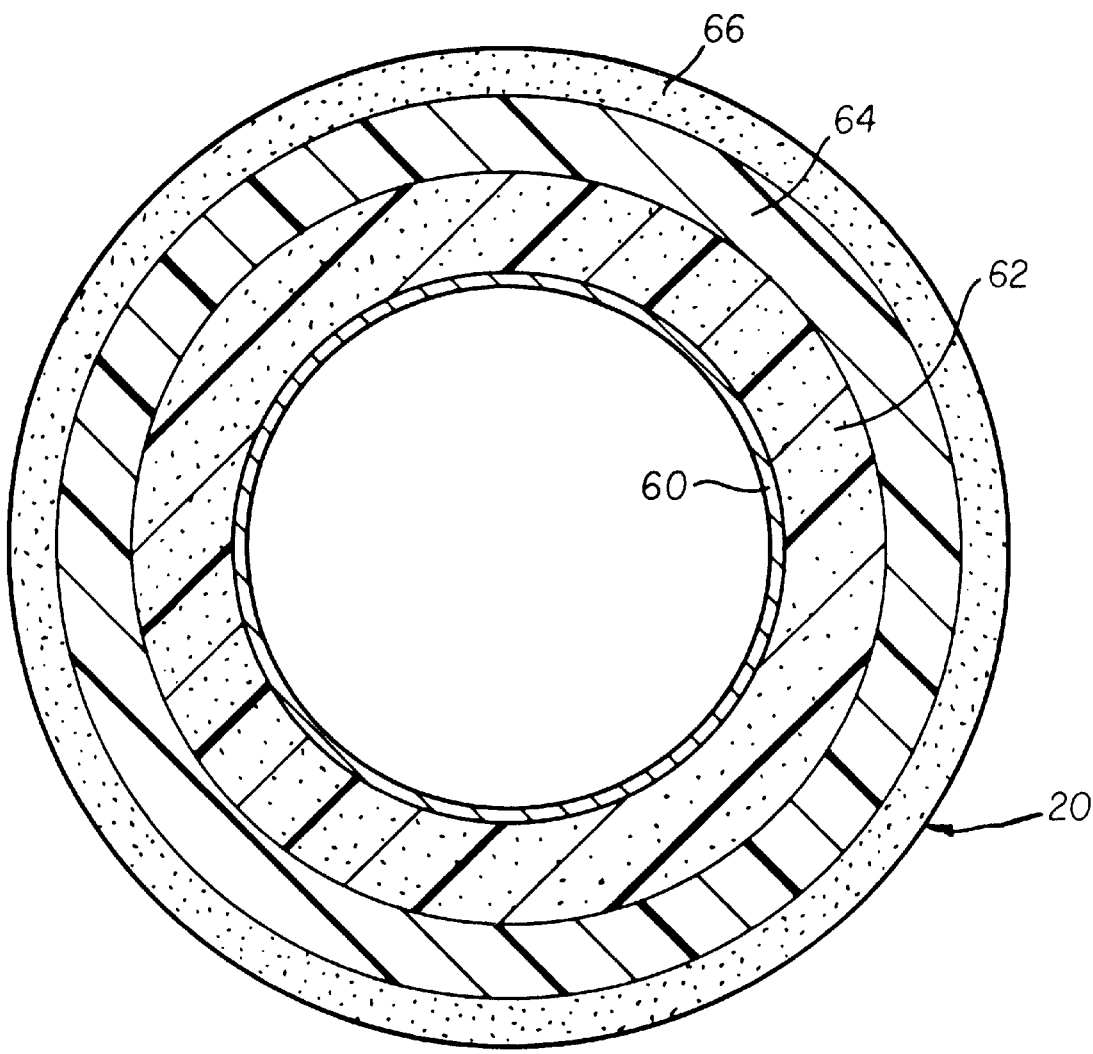
FIG. 2 is a cross-sectional view of a fuser member of FIG. 1.

Referring now to FIG. 1 a fuser assembly 10 is shown which includes a fuser roller 20 and an elastomeric pressure roller 28 which form a nip 30. The fuser roller 20 is made of a silicon-based elastomer. Particulate imaging mixture 40 disposed on a receiver 42 is fused into the receiver 42 at the nip 30 by the application of heat and pressure. As shown a heating lamp 44 is connected to a control circuit 46. The heating lamp 44 is well known to those skilled in the art is provided inside the core of the fuser roller 20. Alternatively, the fuser roller 20 can be externally heated by a heated roller riding along the fuser roller 20. This external heat may replace or merely assist the internal lamp 44. It will be understood depending on the particulate imaging mixture 40 that is used that only pressure need be applied to fuse particulate imaging mixture 40 onto the receiver 42. A continuous supply of polymeric release agent must be used which is approximately 1 to 20 mg per receiver 42, on which particulate imaging mixture 40 is fixed. This polymeric release agent will be discussed in much more detail later.

In accordance with the present invention a long life, controlled polymeric release agent swell fuser member intermediate layer 64 and a fusing assembly 10 of the type wherein a nonfunctional or a functional polymeric release agent is applied to the surface of a fuser roller 20 is provided. The fuser member 20 includes a base member 60, an optional base cushion layer 62 which is conformable and is disposed over the base member 60 and the fuser member intermediate layer 64 disposed over the optional base cushion layer 62 and an outer layer 66 formed of a silicone-based elastomer. In the event the fuser member intermediate layer 64 is of appropriate hardness and mechanical properties described later, the base cushion layer 62 can be composed of the same mixture as the fuser member intermediate layer 64.

The fuser member intermediate layer 64 includes:

(a) a crosslinkable poly(dialkylsiloxane) incorporating an oxide, wherein the poly(dialkylsiloxane) has a weight-average molecular weight before crosslinking of about 1,000 to 90,000;

(b) one or more crosslinkable poly(siloxanes) selected from the group consisting of poly(diarylsiloxane), poly (arylalkylsiloxanes) or mixtures thereof wherein the poly(diaryllsiloxane) or poly(arylalkylsiloxane) has a weight-average molecular weight before crosslinking of about 1,000 to 90,000;

(c) optional silicone T-resin;

(d) optional silane crosslinking agent;

(e) one or more arylsilane crosslinking agent (f) one or more arylsilane chain extender;

(g) optional fillers; and (h) wherein the weight-average molecular weight of the poly(siloxane) mixture is about 5,000 to 80,000. For example, a mixture comprising 83% poly (dialkylsiloxane) having a weight-average molecular weight of 90,000 and 17% poly(diarylsiloxane) having a weight-average molecular weight of 1,000 would have a weight-average molecular weight of 75,000.

In general there are two methods for decreasing the polymeric release agent swell of a mixture. The first is to add inert filler to the mixture. The mechanism is simply the displacement of polymer resulting in less polymer to swell hence less swell. The disadvantage of this approach is that filler is generally not a good releasing surface, which leads to greater contamination and offset. The second and preferred method is to adjust the swell characteristics of the base polymer by affecting such properties as crosslink density and compatibility of the mixture with the polymeric release agent. In general the crosslink density is adjusted by the molecular weight of the component resins. The compatibility of the base polymer to the polymeric release agent can be accomplished through changing the chemical structure of either the fuser roller outer layer such as U.S. Pat. No. 4,807,341 or the polymeric release agent. Changing the chemical structure of the polymeric release agent is in general costly, as it is a consumable. In general changing the chemical structure of the fuser roller results in higher contamination and offset.

In a further aspect of the present invention the base cushion layer 62 is a silicone elastomer layer comprising the crosslinked product of a mixture of at least one polyorganosiloxane having the formula:

where $R^1$ and $R^2$ may be any of hydrogen or unsubstituted alkyl, alkenyl or aryl having less than 19 carbon atoms or fluorosubstituted alkyl having less than 19 carbon atoms, each of A and D may be any of hydrogen, methyl, hydroxyl or vinyl groups and m and n are both integer numbers defining the number of repeat units and independently range from 0 to 10,000; crosslinking agent and crosslinking catalyst.

The base cushion layer 62 of the fuser assembly 10 of the invention includes a crosslinked poly(dialkylsiloxane) having optional fillers. The fillers are an oxide or mixture of oxides. Typical oxides include metal oxides such as aluminum oxide, iron oxide, tin oxide, zinc oxide, copper oxide and nickel oxide. Silica (silicone oxide) can also be used. Other silicone resins are added being one or more crosslinkable poly(diarylsiloxane), poly(arylalkylsiloxanes) or mixtures thereof. An additional optional silicone T-resin is added to the crosslinkable poly(dialkylsiloxane) as well as silane crosslinking agents.

Examples of suitable mixtures for a crosslinked poly (dialkylsiloxane) incorporating an oxide, are poly (dimethylsiloxane) having a weight-average molecular weight before crosslinking of about 5,000 to 80,000 of the outer layer are filled condensation-crosslinked PDMS elastomers disclosed in U.S. Pat. No. 5,269,740 (copper oxide filler), U.S. Pat. No. 5,292,606 (zinc oxide filler), U.S. Pat.

No. 5,292,562 (chromium oxide filler), U.S. Pat. No. 5,548,720 (tin oxide filler), U.S. Pat. No. 5,336,539, (nickel oxide).

Next, one or more crosslinkable poly(diarylsiloxane), poly(arylalkylsiloxanes) or mixtures thereof wherein the (diaryllsiloxane) or poly(arylalkylsiloxane) has a weight-average molecular weight before crosslinking of about 1,000 to 90,000 are added to the poly(dialkylsiloxane).

Silanol-terminated poly(dialkylsiloxane), poly(diarylsiloxane), and poly(arylalkylsiloxanes) polymers and methods of their preparation are well known. They are readily commercially available, e.g., from Huils America, Inc., (United Chemical) and having the repeat unit structure:

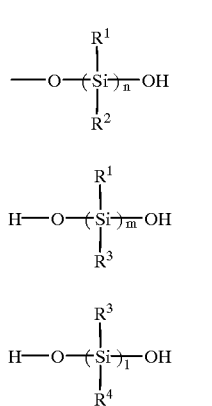

Structure I

Structure II

Structure III

For purpose of the present invention 1, m, and n are integers such that the Structure I, Structure II, and Structure III polymers independently have a weight average molecular weight of from 1,000 to 90,000. $R^1$ and $R^2$ are independently alkyl groups such as methyl, ethyl, propyl, butyl, pentyl, and hexyl. $R^3$ and $R^4$ are independently aryl groups such as phenyl. The molecular weights are chosen such that the weight average molecular weight of the mixture of siloxane resins is between 5,000 and 80,000. If the molecular weight were below 5,000, the final crosslinked network would have a high crosslink density that would make the mixture too hard and brittle, and not resilient enough to serve practically.

The primary crosslinked poly(dialkysiloxane) mixture used for the Examples is Stycast® 4952, obtained from Grace Specialty Polymers. Stycast® 4952 is composed of a network-forming polymer that is a silanol-terminated (α,ω-hydroxy-) poly(dimethylsiloxanc) (PDMS). The number of repeat units is such that the silanol-terminated PDMS (α,ω-dihydroxypoly(dimcthylsiloxane)) has a weight average molecular weight of from 5,000 to 80,000. This composition includes the filler. The filler is between 55–70 wt % aluminum oxide and 5–15 wt % iron oxide particulate fillers. Polyethyl silicate (condensed tetraethylorthosilicate) is present as the crosslinking agent.

The third component of the fuser member intermediate layer 64 is a silicone T-resin. A silicone T-resin as described in United Chemical catalog (page 280 $5^{th}$ edition) is a highly crosslinked mixture with the empirical formula (or repeat unit) $RSiO_{1.5}$ formed from polymerization of silsesquioxane monomers to form by nature an unordered structure. R can be any alkyl or aryl group including but not limited to methyl, phenylpropyl, phenyl, or phenylvinyl. The term "unordered structure" means that the organization of repeat units is substantially random. An example stricture for a such formed silicone T-resin is shown below where • represents a repeat unit.

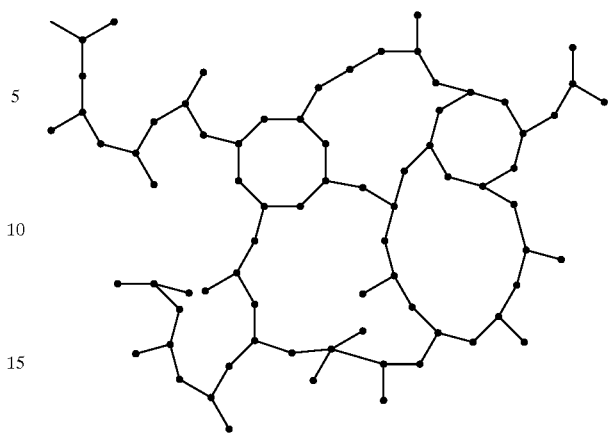

The presence of silicone T-resin in concentrations greater than 26% result in mixtures whose wear resistance is too low to allow for long roller life. Addition of silicone T-resin in amounts less than 5% is insufficient to give the fusing performance benefits described in this invention.

The mixture of silanol terminated poly(dialkylsiloxane), poly(diarylsiloxane), and poly(arylalkylsiloxanes) polymers can be crosslinked with multifunctional silanes. The multifunctional silanes that can serve as crosslinking agents for the Structure I, II, and III polymers arc well known for this purpose. Each of such silanes comprises a silicone atom bonded to at least three groups that are functional to condense with the hydroxy end groups of the Structure (I) polymers to thereby create siloxane crosslinks through the silicone atom of the silane. The functional groups of the silanes can be, for example, acyloxy (R—COO—), alkenoxy ($CH_2$=C(R)O—), alkoxy (R—O—), dialkylamino ($R_2$ N—), or alkyliminoxy ($R_2$ C=N—O—) groups, wherein R represents an alkyl moiety. Some specific examples of suitable multifunctional silane crosslinking agents are methyltrimethoxysilane, tetraethoxysilane, methyltripropenoxysilane, methyltriacetoxysilane, methyltris(butanone oxime)silane, and methyltris(diethylamino)silane.

In addition to any of the above crosslinking agent being added, addition aryl-based silanes are added including phenyltrimethoxysilane as a crosslinking agent and diphenyltrimethoxysilane as a chain extender where this additional crosslinking agent has the general formula a silane crosslinking agent containing at least one aryl group of the general formula $$R^1_x Si(OR^2)_{4-x}$$

where $R^1$ is aryl and $R^2$ is aryl or alkyl and x is an integer less than 4. In the case of x=2, the mixture is a chain extender. On the case of x=1, the mixture is a crosslinking agent.

In the case where alkoxy functional groups arc employed, the condensation crosslinking reaction is carried out with the aid of a catalyst, such as, for example, a titanate, chloride, oxide, or carboxylic acid salt of zinc, tin, iron, or lead. Some specific examples of suitable catalysts are zinc octoate, dibutyltin diacetate, ferric chloride, and lead dioxide.

Specific examples of useful catalysts for this polymer are dibutyltin diacetate, tin octoate, zinc octoate, dibutyltin dichlioride, dibutyltin dibutoxide, ferric chloride, lead dioxide, or mixtures of catalysts such as CAT50® (sold by Grace Specialty Polymers, Massachusetts). CAT50® is believed to be a mixture of dibutyltin dibutoxide and dibutyltin dichloride diluted with butanol.

For the preferred embodiment, the various components of the composite mixture can have the following weight percentages:

(a) 10–45 wt % α,ω-hydroxy- poly(dialkylsiloxane) having a weight average molecular weight of from 1,000 to 90,000;

(b) 5–50 wt % of one or more α,ω-hydroxy-poly(diarylsiloxane) and poly(arylalkylsiloxane) polymers having a weight average molecular weight of from 1,000 to 90,000

(c) 5–26 parts per 100 parts polymer silicone T-resin;

(d) 0–5 wt % silane crosslinking agent;

(e) 1–40 parts per 100 parts arylsilane crosslinking agent (f) 2–25 parts per 100 parts arylsilane chain extender;

(g) 30–85 wt % oxide fillers, especially the combination of 55–70 wt % aluminum oxide and 5–15 wt % iron oxide; and (h) 0.05–2 wt % catalyst.

To form the fuser member intermediate layer 64 of a fuser assembly 10 in accordance with the invention, the poly(dialkylsiloxane) and one of more poly(diarylsiloxane), poly(arylalkylsiloxanes) or mixtures thereof polymers, an excess of the stoichiometric amount of multifunctional silane to form crosslinks with all the hydroxy end groups, and the appropriate amount of fillers are thoroughly mixed on a three-roll mill. The silicone T-resin is also incorporated at this time. The arylsilane is then be added at this time or prior to coating. If a catalyst is necessary, it is then added to the mix with thorough stirring. The mix is then dissolved in appropriate solvents such as low ketones and coated onto the fuser member base cushion layer 62 fuser member, e.g. roll The coated fuser member remains at room temperature for a time sufficient for some crosslinking to occur (e.g., .5 hours). The coated roller is then heated to accelerate the remaining crosslinking.

The following Examples further define and describe fuser members prepared by the present invention and illustrate preferred embodiment of the present invention. Unless otherwise indicated, all parts and percentages are by weight.

EXAMPLES

Example 1

100 parts Stycast® 4952 (a crosslinked poly(dimethylsiloxane) incorporating an oxide) was blended with 50 parts PS 090 obtained from United Chemical being a poly(dimethylsiloxane)-co-poly(diphenylsiloxane) containing 18–22 mole % phenyl groups was blended with 10 parts GE Tospearl 145 spherical fine white powder on a 3 roller mill. 5 parts D6010 also obtained from United Chemicals being diphenyldimethoxysilane were stirred into the mixture. CAT50® catalyst (a dibutyltindiacetate) was added at the rate of one part of catalyst to 200 parts by weight Stycast® 4952. The mixture was degassed and molded in the shape of a 90 mil×6 inch×6 inch slab. The slab was air cured 12 hours at 25° C. then demolded. The slab was the cured with a 12 hour ramp to 200° C. followed by an 18 hour hold at 200° C. The slab was then subjected to testing as will be described in more detail later.

Example 2

80 parts PS084 obtained from United Chemical being a poly(dimethylsiloxane)-co-poly(diphenylsiloxane) containing 14–18 mole % phenyl groups was blended with 20 parts DC3-0133 obtained from Dow Corning being a crosslinkable poly(dimethylsiloxane). 20 parts of PO330 obtained from United Chemicals being phenyltrimethoxysilane and 5 parts D6010 also obtained from United Chemicals being diphenyldimethoxysilane were stirred into the mixture. CAT50® catalyst (a dibutyltindiacetate) was added at the rate of one part of catalyst to 200 parts by weight Stycast® 4952. The mixture was degassed and molded in the shape of a 90 mil×6 inch×6 inch slab. The slab was air cured 12 hours at 25° C. then demolded. The slab was the cured with a 12 hour ramp to 200° C. followed by an 18 hour hold at 200° C. The slab was then subjected to testing as will be described in more detail later.

Example 3

100 parts PS084 was blended with 20 parts DC3-0133, and 20 parts GE Tospearl 145 spherical fine white powder on a 3 roller mill. 22 parts of PO330 and 7.5 parts D6010 were stirred into the mixture. CAT50® catalyst was added at the rate of one part of catalyst to 200 parts by weight Stycast® 4952. The mixture was degassed and molded in the shape of a 90 mil×6 inch×6 inch slab. The slab was air cured 12 hours at 25° C. then demolded. The slab was the cured with a 12 hour ramp to 200° C. followed by an 18 hour hold at 200° C. The slab was then subjected to testing as will be described in more detail later.

Example 4

90 parts PS084 was blended with 10 parts DC3–0133 and 20 parts GE Tospearl 145 spherical fine white powder on a 3 roller mill. 20 parts of PO330 obtained from United Chemicals being phenyltrimethoxysilane and 5 parts D6010 also obtained from United Chemicals being diphenyldimethoxysilane were stirred into the mixture. CAT50® catalyst (a dibutyltindiacetate) was added at the rate of one part of catalyst to 200 parts by weight Stycast® 4952. The mixture was degassed and molded in the shape of a 90 mil×6 inch×6 inch slab. The slab was air cured 12 hours at 25° C. then demolded. The slab was the cured with a 12 hour ramp to 200° C. followed by an 18 hour hold at 200° C. The slab was then subjected to testing as will be described in more detail later.

Example 5

80 parts was blended with 20 parts DC3-0133 along with 7.5 parts fumed silica and 20 parts zinc oxide (1–5 micron particle size) on a three-roll mill. 22 parts of PO330 and 7.5 parts D6010 were stirred into the mixture. CAT50® catalyst was added at the rate of one part of catalyst to 200 parts by weight Stycast® 4952. The mixture was degassed and molded in the shape of a 90 mil×6 inch×6 inch slab. The slab was air cured 12 hours at 25° C. then demolded. The slab was the cured with a 12 hour ramp to 200° C. followed by an 18 hour hold at 200° C. The slab was then subjected to testing as will be described in more detail later.

Example 6

100 parts PS084 was blended with 20 parts DC3-0133, 15 parts GE Tospearl 145 spherical fine white powder, and 5 parts fumed silica on a 3 roller mill. 22 parts of PO330 and 7.5 parts D6010 were stirred into the mixture. CAT50 ® catalyst was added at the rate of one part of catalyst to 200 parts by weight Stycast® 4952. The mixture was dissolved in methylethylketone to form a 60% solids solution. This solution was then ring coated onto a corona treated roller fonmed of Stycast(g 4952. The layer was allowed to dry for 15 hours. The roller was corona treated again and ring coated with a layer of Stycast® 4952 having been dissolved in methylethylketone (60% solids). The roller was then allowed to dry at room temperature for two hours followed by a twelve hour ramp to 200° C. and a soak at 200° C. for 18 hours. The roller was then tested as described below.

Example 7

100 parts PS084 was blended with 20 parts DC3-0133, 15 Zinc Oxide 1–5 micron particles obtained from Atlantic Equipment, and 5 parts fumed silica on a 3 roller mill. 22 parts of PO330 and 7.5 parts D6010 were stirred into the mixture. CAT50 catalyst was added at the rate of one part of catalyst to 200 parts by weight Stycast® 4952. The mixture was dissolved in methylethylketone to form a 60% solids solution. This solution was then ring coated onto a corona treated roller formed of Stycast® 4952. The layer was allowed to dry for 15 hours. The roller was corona treated again and ring coated with a layer of Stycast® 4952 having been dissolved in methylethylketone (60% solids). The roller was then allowed to dry at room temperature for two hours followed by a twelve hour ramp to 200° C. and a soak at 200° C. for 18 hours. The roller was then tested as described below.

Comparative Example 1

100 parts Viton® B50 was mixed with 6 parts calcium hydroxide and 3 parts Maglite D 2.5 parts Viton® Curative 20 and 6 parts Viton® Curative 30 on a two roll mill. A solution was formed by dissolving this compounding in methylethylketone to form a 25% solids solution. This solution was then ring coated onto a corona treated roller formed of Stycast® 4952. The layer was allowed to dry for 0.5 hours. The roller was corona treated again and ring coated with a layer of Stycast®t 4952 having been dissolved in methylethylketone (60% solids). The roller was then allowed to dry at room temperature for two hours followed by a twelve hour ramp to 200° C. and a soak at 200° C. for 18 hours. The roller was then tested as described below.

Testing of Fuser Member Intermediate Layers
Polymeric Release Agent Swell

Polymeric release agent (oil) swell was measured by immersing a weighed sample in 1000 cts (centistokes) Dow Corning DC200 poly(dimethylsiloxane) for 7 days at 175° C. and calculating the weight gain.

Dry Adhesion

In order to determine the adhesion of the Stycast® 4952 to the layer of the present invention. A section of the roller described in Example 6 was derubberized to result in a thin sheet of rubber which consisted of the base layer of Stycast® 4952, the intermediate layer described in Example 5, and an outer layer of Stycast® 4952. The sheet was cut to a set width of 6 mm by approximately 50 mm long. The outer layer of Stycast® 4952 was then peel back from the intermediate layer while measuring the force needed to peel the layers apart on a tensile tester. Results are reported as average grams of force per 6 mm width.

Polymeric Release Agent Adhesion

The sample for the polymeric release agent swollen adhesion was obtained by immersing a section of the roller fonned in Example 6 in 1000 cts polydimethylsiloxane polymeric release agent as in the polymeric release agent swell test for seven days at 175° C. The roller section was then cut and measured as for the dry adhesion.

The results are shown in the following tables

TABLE I

| Sample | Swell (%) |
|--------|-----------|
| E1 | 0.4 |
| E2 | 0.04 |
| E3 | 0 |
| E4 | 0 |
| E5 | 0 |

TABLE II

| Sample | Polymeric release agent Adhesion (g) |
|--------|--------------------------------------|
| E6 | 33 |
| E7 | 51 |
| CE1 | 19.5 |

Thus according to the present invention a new and improved controlled polymer release agent swell intermediate layer has been provided. It is an important feature of the present invention that the fuser member intermediate layer 64 is formed of a silicone mixture selected so that its swelling in 1000 cts poly(dimethylsiloxane) is less than 1% by weight as shown in Table I. Another important feature of the invention is the improved adhesion of the fuser member intermediate layer 64 to the base cushion layer 62. This is demonstrated in Table II.

The fuser members of this invention, particularly the fuser rollers, possess extremely desirable physical and mechanical characteristics as indicated in the tests results above. The fuser rollers have excellent toner release properties, without sacrificing toughness, abrasion resistance or especially adhesion. The coating mixtures exhibit these desirable properties when they are prepared according to the process of this invention.

The invention has been described in detail with particular reference to certain preferred embodiments thereof, but it will be understood that variations and modifications can be effected within the spirit and scope of the invention.

What is claimed is:

1. A roller for use in a fusing assembly for receiving a polymeric release agent, the roller comprising:
   (a) a core and multiple layers secured over the core; and
   (b) the multiple layers including:
      (i) at least one outer layer formed of a first silicone mixture which absorbs the polymeric release agent and has toner release properties; and
      (ii) an intermediate layer in contact with the at least one outer layer, the intermediate layer formed of a second silicone mixture selected so that its swelling in 1000 cts poly(dimethylsiloxane) is less than 1% by weight.

2. The roller of claim 1 wherein the second silicone mixture is condensation crosslinked.

3. A roller for use in a fusing assembly for receiving a polymeric release agent, the roller comprising:
   (a) a core and multiple layers secured over the core; and
   (b) the multiple layers including:
      (i) a cushion layer formed over the core, and at least one outer layer formed of a first silicone mixture which absorbs the polymeric release agent and has toner release properties; and
      (ii) an intermediate layer in contact with the at least one outer layer and formed between the cushion layer and the outer layer, the intermediate layer formed of a second silicone mixture selected so that its swelling in 1000 cts poly(dimethylsiloxane) is less than 1% by weight.

4. The roller of claim 3 wherein the second silicone mixture includes a crosslinkable poly(dialkylsiloxane), one or more crosslinkable poly(siloxanes) comprising pendant aryl groups, one or more arylsilane crosslinking agent, and one or more arylsilane chain extender, and wherein the weight-average molecular weight of the mixture is in a range of about 5,000 to 80,000 weight-average molecular weight.

5. The roller of claim 4 wherein the second silicone mixture further includes silicone T-resin, silane crosslinking agents, and fillers.

6. The roller of claim 4 wherein the second silicone mixture includes a crosslinkable poly(dialkylsiloxane) incorporating an oxide, wherein the poly(dialkylsiloxane) has a weight-average molecular weight before crosslinking of about 1,000 to 90,000, one or more crosslinkable poly(siloxane) selected from the group consisting of poly(diarylsiloxane), poly(arylalkylsiloxanes), or mixtures thereof wherein the poly(diarylsiloxane) or poly(arylalkylsiloxane) has a weight-average molecular weight before crosslinking of about 1,000 to 90,000, a silicone T-resin, and at least one silane crosslinking agent.

7. The roller of claim 6, wherein the crosslinked poly(dialkylsiloxane) incorporating an oxide is a mixture which, includes an (α,ω-hydroxy-) poly(dialkylsiloxane) with the repeat unit structure

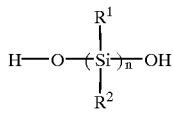

where n is an integers such that the weight average molecular weight is from 1,000 to 90,000, $R^1$ and $R^2$ are independently alkyl groups selected from methyl, ethyl, propyl, butyl, pentyl, or hexyl; a polyethylsilicate crosslinking agent; and an oxide filler containing particles of aluminum oxide or iron oxide.

8. The roller of claim 3 wherein the cushion layer comprises a crosslinked product of a mixture of at least one polyorganosiloxane having the formula:

where $R^1$ and $R^2$ can be hydrogen or unsubstituted alkyl, alkenyl or aryl having less than 19 carbon atoms, or fluorosubstituted alkyl having less than 19 carbon atoms, each of A and D may be any of hydrogen, methyl, hydroxyl or vinyl groups, and m and n are both integer numbers defining the number of repeat units and independently range from 0 to 10,000; crosslinking agent and crosslinking catalyst.

9. The roller of claim 3 wherein during use of the roller in the fusing assembly, the roller is positively driven and contacts a release agent donor roller which is driven by fiictional contact with the positively driven roller.

10. The roller of claim 3 wherein the second silicone mixture is condensation crosslinked.

11. In a fusing assembly for fixing toner to a receiver and having a fuser roller and a pressure roller forming a fixing nip, a metering roller, means for applying a polymeric release agent to the metering roller, and a release agent donor roller for receiving polymeric release agent from the metering roller and applying it to the surface of the fusing roller, the fuser roller comprising a core and multiple layers secured over the core, the multiple layers including:

(i) at least one outer layer formed of a first silicone mixture which can absorb the polymeric release agent and has toner release properties; and (ii) an intermediate layer in contact with the outer layer and formed of a second silicone mixture selected so that its swelling in 1000 cts poly(dimethylsiloxane) is less than 1% by weight, such second silicone mixture including:

(a) a crosslinkable poly(dialkylsiloxane) incorporating an oxide, wherein the poly(dialkylsiloxane) has a weight-average molecular weight before crosslinking of about 1,000 to 90,000;

(b) one or more crosslinkable poly(siloxanes) selected from the group consisting of poly(diarylsiloxane), poly(arylalkylsiloxanes), or mixtures thereof wherein the poly(diaryllsiloxane) or poly(arylalkylsiloxane) has a weight-average molecular weight before crosslinking of about 1,000 to 90,000;

(c) optional silicone T-resin;

(d) optional silane crosslinking agent;

(e) one or more arylsilane crosslinking agent;

(f) one or more arylsilane chain extender; and (g) optional fillers;

wherein the weight-average molecular weight of the mixture of poly(dialkylsiloxane) of (a) and poly(siloxane) of (b) is about 5,000 to 80,000.

12. The fusing assembly of claim 11 wherein the second silicone mixture is condensation crosslinked.

* * * * *